(12) United States Patent
Ozarkar et al.

(10) Patent No.: US 11,698,916 B1
(45) Date of Patent: Jul. 11, 2023

(54) TRACING TIMESTAMPS THROUGH IMMUTABLE RECORDS

(71) Applicant: Equinix, Inc., Redwood City, CA (US)

(72) Inventors: Anand Ozarkar, San Jose, CA (US); Ankur Sharma, Sunnyvale, CA (US)

(73) Assignee: EQUINIX, INC., Redwood City, CA (US)

( * ) Notice: Subject to any disclaimer, the term of this patent is extended or adjusted under 35 U.S.C. 154(b) by 3 days.

(21) Appl. No.: 17/133,903

(22) Filed: Dec. 24, 2020

Related U.S. Application Data

(60) Provisional application No. 62/976,236, filed on Feb. 13, 2020.

(51) Int. Cl.
| | |
|---|---|
| G06F 16/00 | (2019.01) |
| G06F 16/27 | (2019.01) |
| G06F 16/25 | (2019.01) |
| G06F 1/12 | (2006.01) |
| G06F 16/23 | (2019.01) |
| G06F 16/22 | (2019.01) |

(52) U.S. Cl.
CPC ............ *G06F 16/27* (2019.01); *G06F 1/12* (2013.01); *G06F 16/22* (2019.01); *G06F 16/2365* (2019.01); *G06F 16/2379* (2019.01); *G06F 16/258* (2019.01)

(58) Field of Classification Search
CPC .... G06F 16/2379; G06F 16/27; G06F 21/602; G06F 21/64; G06F 1/12; G06F 16/22; G06F 16/2365; G06F 16/25; G06F 16/258
See application file for complete search history.

(56) References Cited

U.S. PATENT DOCUMENTS

| | | | |
|---|---|---|---|
| 9,886,267 B2 | 2/2018 | Maheshwari et al. | |
| 9,948,552 B2 | 4/2018 | Teng et al. | |
| 10,129,078 B2 | 11/2018 | Kumar et al. | |
| 2006/0074971 A1* | 4/2006 | Groenveld | G06F 16/20 707/999.102 |
| 2018/0254841 A1* | 9/2018 | Nannra | H04L 69/28 |

(Continued)

OTHER PUBLICATIONS

U.S. Appl. No. 16/696,340, filed Nov. 26, 2019, naming inventors Ozarkar et al.

(Continued)

*Primary Examiner* — Dinku W Gebresenbet
(74) *Attorney, Agent, or Firm* — Shumaker & Sieffert, P.A.

(57) ABSTRACT

Systems and methods include techniques for recording information for tracing a timestamp to its source. The techniques can facilitate auditing of a time service by external auditors. The timestamps can be collected from all the sources and intermediate touch points like timing and network switches and can be stored in a distributed time ledger. In one example, a method includes receiving, at a collection time by a time collector, a timestamp from each of a plurality of timing devices at a collection time; aggregating the timestamp of each of the plurality of timing devices into a timestamp record, the timestamp record including the collection time and a timestamp entry for each of the timing devices, wherein the timestamp entry for a timing device includes a timing device identifier and the timestamp corresponding to the timing device providing the timestamp; and inserting the timestamp record into an immutable time ledger.

19 Claims, 8 Drawing Sheets

(56) References Cited

U.S. PATENT DOCUMENTS

2020/0042920 A1* 2/2020 Moorthy .......... G06Q 10/06315
2020/0236032 A1* 7/2020 Singla .................... H04L 45/03

OTHER PUBLICATIONS

"HyperLedger Indy," HyperLedger, Retrieved May 11, 2021 from: https://web.archive.org/web/20200515003849/https://www.hyperledger.org/use/hyperledger-indy, Accessed May 15, 2020, 5 pp.

"Logging Cheat Sheet," OWASP, Retrieved May 11, 2021 from: https://web.archive.org/web/20200206091858/https://owasp.org/www-project-cheat sheets/cheatsheets/Logging_Cheat_Sheet.html, Accessed Feb. 6, 2020, 20 pp.

Rosenblum et al., "The Design and Implementation of a Log-Structured File System," ACM Transactions on Computer Systems, vol. 10, No. 1, Feb. 1992, pp. 26-52.

"List of log-structured file systems," Wikipedia, Retrieved May 11, 2021 from: https://web.archive.org/web/20200207032309/https://en.wikipedia.org/wiki/List_of_log-structured_file_systems, Accessed Feb. 7, 2020, 2 pp.

Matsakis et al., "Metrological and legal traceability of time signals," NIST 2018 Precise Time and Time Interval (PTTI) Meeting, Jan. 29-Feb. 1, 2018, pp. 59-71.

\* cited by examiner

TRACING TIMESTAMPS THROUGH IMMUTABLE RECORDS

CROSS REFERENCE TO RELATED APPLICATION

This application claims the priority benefit of U.S. Provisional Application No. 62/976,236 filed Feb. 13, 2020, the entire content of which is incorporated herein by reference.

TECHNICAL FIELD

The disclosure relates to a time service and, more specifically, tracing timestamps to tracing timestamps produced by heterogenous timing devices.

BACKGROUND

Software applications often make use of time information provided by a timing device. As an example, a financial application may execute stock market trades. It can be important to know the time a trade was executed in order to resolve potential disagreements regarding the order that trades were executed. Thus, financial applications often include a timestamp obtained from a timing device in the transaction data. Timestamps for transactions may also be required to comply with a regulatory scheme. Other types of applications can make similar uses of timestamps and may have similar requirements regarding the use of timestamps. For example, game systems may use timestamps to determine an order of commands, actions, or events in a game.

A synchronization system, in general, synchronizes clocks of multiple devices based on the clock of a chosen master device (also referred to as a "primary" device or a "leader" device). The master device is a computing device that obtains time synchronization data from other master devices or intelligent engines deployed either inside or outside of the synchronization system, such as a global positioning system (GPS). The typical synchronization system has one or more layers of master devices with other end devices (also referred to as "slave" devices, "replica" devices, or "follower" devices) connected to at least one master device. Master devices are connected to the more precise sources of timestamps. In typical synchronization systems, master devices are subdivided in groups (also referred to as "strata"). GPS master devices may belong to the strata 0 group. These devices are also referred to as "grand master" devices. Strata (also referred to as "stratum") 0 master devices are connected to strata 1 devices. Strata 1 devices generally have less precise sources of timestamps than strata 0 devices. Strata 1 master devices can be connected to strata 2 master devices or directly to the end devices. In general, strata "i" master devices can be connected to strata "i+1" master devices or slave devices. In some implementations, master devices may belong to a service provider and can be designed to support precise time processing, while end devices (also referred to as "slave" devices) may belong to the service client and receive timestamp offsets from master devices. These master and end devices can be chosen arbitrarily or assigned by the network.

SUMMARY

In many applications, including but not limited to financial, scientific, military, programmatic advertising, and gaming industries, accurate time sources may be beneficial. For instance, such time sources be used to define trade orders in high-frequency trading systems and gamers response in multi-user games. In such timing environments, it may be desirable, or even a requirement, to be able to log and trace timestamps. For example, Markets in Financial Instruments Directive (MiFID) and Financial Industry Regulatory Authority (FINRA) may impose logging and traceability recommendations or requirements for time services.

In general, the disclosure describes techniques for recording the information for tracing a timestamp to its source. The techniques can facilitate auditing of a time service by external auditors. The timestamps can be collected from all the sources and intermediate touch points like timing and network switches and can be stored in a distributed time ledger.

In one example, a method includes receiving, at a collection time by a time collector executable by one or more processors, a timestamp from each of a plurality of timing devices at a collection time; aggregating the timestamp of each of the plurality of timing devices into a timestamp record, the timestamp record including the collection time and a timestamp entry for each of the plurality of timing devices, wherein the timestamp entry for a timing device includes a timing device identifier and the timestamp corresponding to the timing device providing the timestamp; and inserting the timestamp record into an immutable time ledger.

In another example, a method includes receiving, by an auditor executable by one or more processors, a timestamp to be audited and an identifier of a timing device producing the timestamp to be audited; retrieving, by the auditor from an immutable ledger, a timestamp record based on a collection time of the timestamp record and the timestamp to be audited; and validating, by the auditor, the timestamp to be audited based on the timestamp entries of the timestamp record.

In a further example, a system includes a plurality of timing devices; a time collector configured to obtain, from each of the plurality of timing devices a timestamp and a timing device ID; and an aggregator configured to: generate a timestamp record, the timestamp record including a collection time that the time collector obtained the timestamps from the plurality of timing devices, and a timestamp entry for each of the plurality of timing devices, the timestamp entry including the timing device ID and the timestamp of the corresponding timing device, and insert the timestamp record into an immutable ledger.

In another example, a non-transitory computer readable medium includes instructions that, when executed by one or more processors, cause the one or more processors to perform any method or combination of methods described herein.

In a still further example, a system includes one or more processors and instructions, that when executed, perform any method or combination of methods described herein.

The details of one or more examples of the disclosure are set forth in the accompanying drawings and the description below. Other features, objects, and advantages of the disclosure will be apparent from the description and drawings, and from the claims.

DETAILED DESCRIPTION

One example implementation environment for the techniques described herein is within data centers. Data centers may house multiple different types of devices, each owned by different entities, but each of the devices may be linked inside this overall data center structure. Some devices within the data center may exchange data with other devices in the same data center but may also exchange data with devices located in data centers in different geographic/metropolitan areas. As such, data centers may implement the techniques described herein to provide time services and provide logging and traceability for the timing devices used by time services, and the clients (e.g., data center tenants) that utilize time services.

Figure 1:
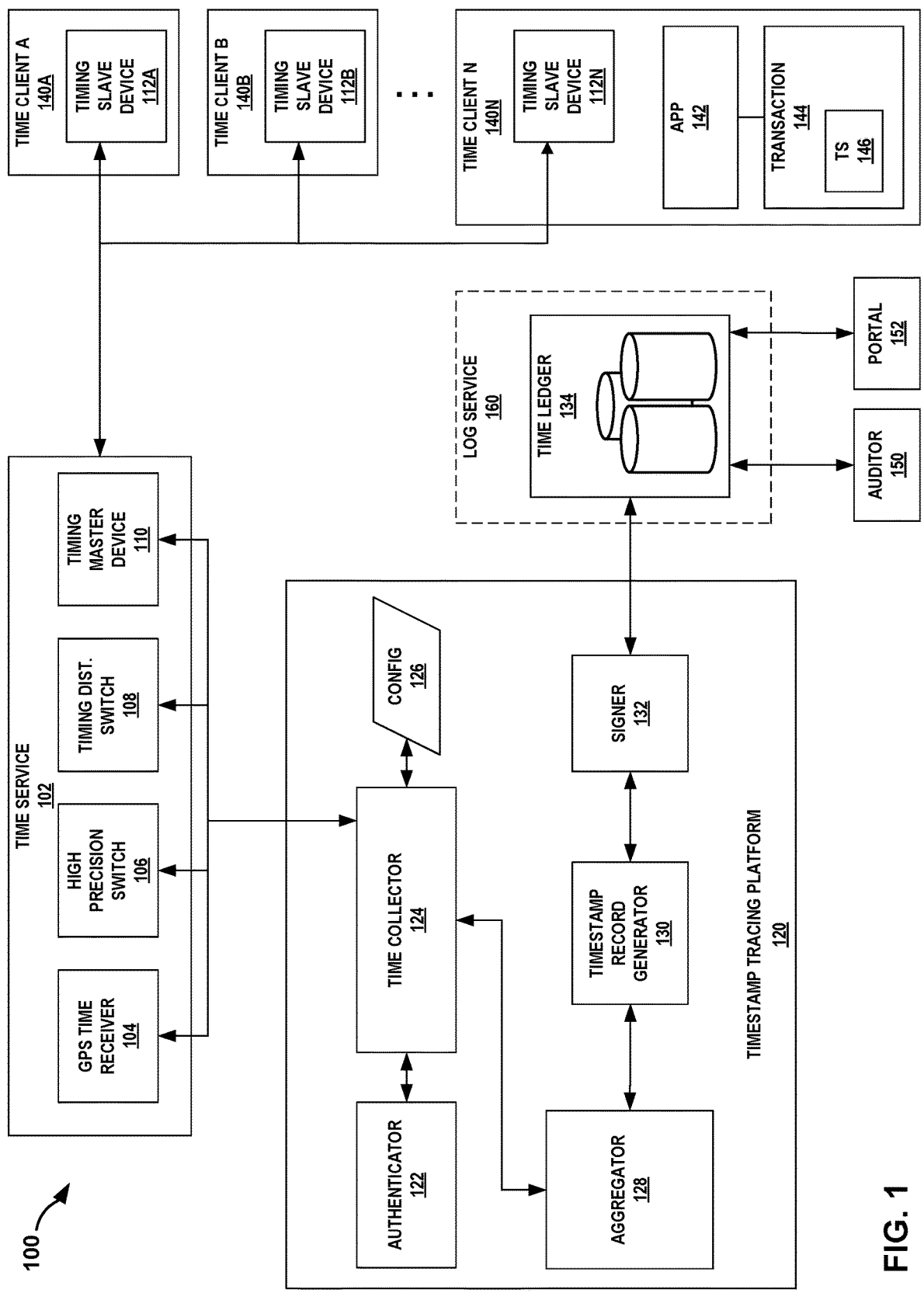
FIG. 1 is a block diagram of an example timestamp tracing system with a hierarchy of timing devices, in accordance one or more techniques of the current disclosure.

FIG. 1 is a block diagram of an example timestamp tracing system 100 with a hierarchy of timing devices at different strata, in accordance one or more techniques of the current disclosure. In some aspects, system 100 includes a time service 102 and a timestamp tracing platform 120. Time service 102 may include timing devices, some of which may be at different timing strata from one another. A timing strata may refer to a position in a hierarchy of timing devices. For example, a strata zero timing device may include the most accurate and/or most precise timing devices. A strata zero timing device is typically the reference timing device in a hierarchy. Examples of strata zero timing devices are atomic clocks, GPS based clocks, or other radio clocks. A strata one timing device may synchronize with the strata zero timing device. In some cases, a strata one timing device may synchronize to within a few microseconds of its associated strata zero timing device. A strata two timing device may synchronize with a strata one device and so on.

In the example illustrated in FIG. 1, time service 102 includes a GPS time receiver 104, a high precision switch 106, a timing distribution switch 108, and a timing master device 110. GPS time receiver 104 may be a strata zero time device with high precision switch 106, timing distribution switch 108, and timing master device 110 being strata one or higher timing devices. A strata zero timing device may be referred to as a "primary" device, a "grand master" device, or a "leader" device.

GPS time receiver 104 may receive time signals from GPS satellites, and provide precise time information to other timing devices or time clients. As an example, GPS time receiver 104 may synchronize time information with high precision switch 106, timing distribution switch 108 or timing master device 110. In some aspects, a time protocol such as Precision time protocol (PTP) or Network time protocol (NTP) may be used to synchronize the time on high precision switch 106, timing distribution switch 108 or timing master device 110 with the time on GPS time receiver 104. PTP is a protocol that may be used to synchronize clocks throughout a computer network. NTP is a networking protocol that may be used for clock synchronization between computer systems over packet-switched, variable-latency data networks. The synchronization process generally estimates a time difference between timing devices by analyzing previous measurements as well as the physical state of the devices and connections between them. The difference between the timestamps between two timing devices may be referred to as a "timestamp offset," or "offset."

High precision switch 106 may be a strata one timing device that provides time information (e.g., timestamps) to devices coupled to the high precision switch 106. High precision switch 106 may synchronize time with GPS time receiver 104 and may provide time information that may not be as precise as that provided by GPS time receiver 104. High precision switch 106 may facilitate the receipt, processing, and forwarding of timestamps to destination devices.

Timing distribution switch 108 may be a strata one or higher timing device that may synchronize time with high precision switch 106 or GPS time receiver 104. The time information provided by timing distribution switch 108 may not be as precise as that of GPS time receiver 104 and high precision switch 106. Timing distribution switch 108 may facilitate the receipt, processing, and forwarding of timestamps to destination devices such as time clients 140.

Timing master device 110 may be a strata one or higher timing device that synchronizes time information with GPS time receiver 104, high precision switch 106, or timing distribution switch 108.

Time clients 140A-140N (generically referred to as time client 140) may be computing devices that execute applications that utilize time information. Time clients 140A-140N may have corresponding timing slave devices 112A-112N (generically referred to as a timing slave device 112) that are internal clocks for the time clients 140A-140N. A timing slave device 112 may be a strata two or higher time device. Timing slave device 112 synchronizes time with time service 102. For example, timing slave device 112 may synchronize time information with timing master device 110 of time service 102. A time client 140 can have a single timing slave device 112 or more than one timing slave device 112, including one or more of a Network Interface Card (NIC) card clock, a Graphics Processing Unit (GPU) clock, a central processing unit (CPU) clock, or an operating system clock.

In the example illustrated in FIG. 1, time client N 112N executes an application 142 that creates a transaction 144. Application 142 may obtain a time value from timing slave device 112N for use as a timestamp 146. Application 142 may include timestamp 146 in transaction 144 as an indication of when transaction 144 occurred.

In some aspects, timestamp tracing platform 120 includes a time collector 124, an aggregator 128, a timestamp record generator 130, and a signer 132. Time collector 124 collects timestamps from the timing devices within a system such as the timing devices of time service 102. In some aspects, time collector 124 may also collect timestamps from timing slave devices 112 that utilize the time service 102. Such timestamps may be associated with a client identifier (ID) in addition to the timing device identifier associated the timing slave device 112. The client ID may be a time client 140 identifier, or an identifier associated with an owner or operator time client 140. Time collector 124 may collect the timestamps at periodic intervals, or in response to a triggering event. The time collection intervals, triggering events, and other parameters related to collecting timestamps from timing devices may be maintained in configuration data 126. In some aspects, the time collection interval may be five times per hour, i.e., every twelve minutes. However, the time collection interval may have other values. In general, a time collection interval is selected that can provide acceptable tracing, while avoiding overwhelming the timing devices provided by time service 102 with timestamp requests that may result in inadequate service or greater error in the time data provided by the timing devices of time service 102. Time collector 124 may also record the time that the timestamps were collected from the timing devices. This time will be referred to as a collection time.

Aggregator 128 may receive the timestamps collected by time collector 124. In some aspects, the timing devices may provide their timestamps in varying formats which may be different from one another. Aggregator 128 may convert the timestamps into a uniform or standard format.

Timestamp record generator 130 may receive the potentially converted timestamps and a collection timestamp indicating the collection time and form a timestamp record. An example of a timestamp record used in some aspects is described below with respect to FIG. 2. Timestamp record generator 130 may provide the timestamp record to a signer 132. Signer 132 may digitally sign the timestamp record with a signature associated with the timestamp tracing platform 120.

The timestamp record may then be inserted into time ledger 134. In some aspects, time ledger 134 is a distributed ledger, for example, a ledger that may be implemented using blockchain technology (i.e., a blockchain ledger). In some aspects, time ledger 134 is implemented using Hyperledger Indy, available from the URL www.hyperledger.org/projects/hyperledger-indy.

In some aspects, a single time ledger 134 may be maintained for timestamp records associated with different timing slave devices 112 of corresponding different time clients 140. In some aspects, each time client 140 (or an owner or operator thereof) may have their own decentralized ID (DID). The time ledger may restrict access to the timestamp records associated with a timing slave device 112 to the DID of time client 140 associated with the timing slave device 112. The DID may be globally unique (at least within system 100) and may be created independently of system 100 (for example, by an owner or operator of a time client 140).

Time ledger 134 may be incorporated as part of a log service 160. Log service 160 may maintain time ledger 134 and may implement multi-party access controls to time ledger 134. For example, log service 160 may provide digital wallets that may be securely associated with clients of time service 102 and auditors of time service 102 (both internal auditors and external auditors). The wallets may include credentials that determine the access that may be granted to the time records maintained in time ledger 134. For example, the wallets may include credentials associated with a DID of a time client or auditor. An example of a log service is described in U.S. patent application Ser. No. 16/696,340 entitled "TAMPER-RESISTANT, MULTI-PARTY LOGGING AND LOG AUTHENTICITY VERIFICATION" filed on Nov. 26, 2019, which is hereby incorporated by reference herein.

In some aspects, timestamp tracing platform 120 may include an authenticator 122. Authenticator 122 may, at system startup or other appropriate time, authenticate the timing devices provided by time service 102. Authenticator 122 may also authenticate time collector 124.

Further details on the operation of timestamp tracing platform 120 may be found below with respect to FIG. 5.

System 100 may include a portal 152. Portal 152 may provide a user interface that allows a user to view timestamp records associated with their timing slave devices 112. For example, a user associated with time client 140A may utilize credentials stored in a wallet associated with time client 140A to view timestamp records that include timestamp information for timing slave device 112A.

System 100 may include an auditor 150. Auditor 150 may receive a timing device ID, a timestamp indicating a time of interest, and validation criteria. Auditor 150 may the retrieve one or more timestamp records from time ledger 134 associated with the timing device ID that were created at or near the time of interest. Auditor 150 may the use the information in the timestamp record to determine whether or not the timing device associated with the timing device ID can be traced back to a strata zero timing device (e.g., GPS time receiver 104) and whether the timestamp meets the validation criteria. Further details on the operation of auditor 150 may be found below with respect to FIG. 6.

Some or all of the functionality described above may be combined with other functionality or provided by additional modules not shown in FIG. 1. As an example, time collector 124 may perform the functions of aggregator 128, timestamp record generator 130, and signer 132.

Figure 2:
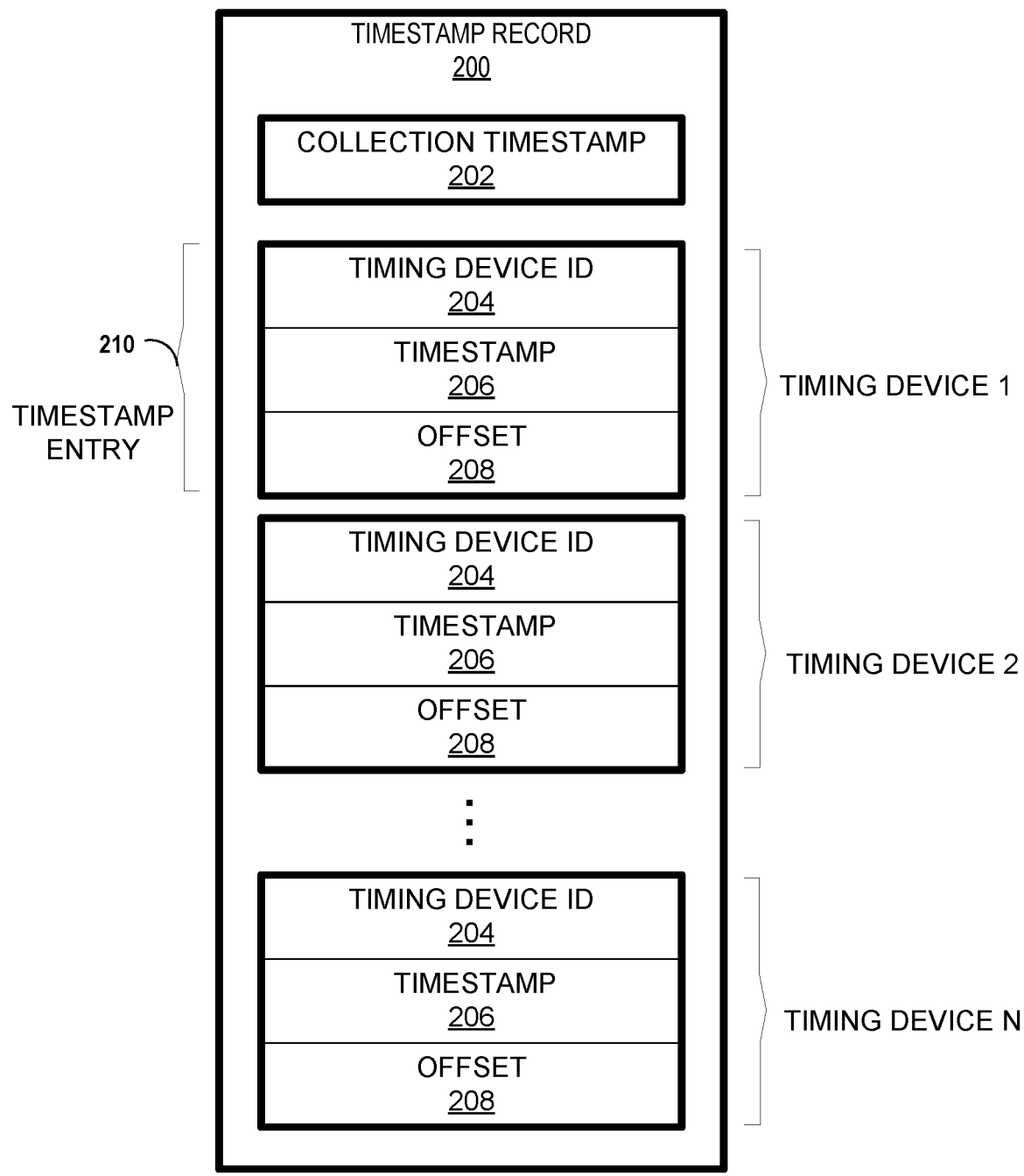
FIG. 2 is a block diagram of a timestamp record in accordance with the current disclosure.

FIG. 2 is a block diagram of a timestamp record 200 in accordance with the current disclosure. In some aspects, timestamp record 200 includes a collection timestamp 202 and timestamp entries 210, with one timestamp entry being included for each timestamp collected from a timing device. Collection timestamp 202 is a time value indicating the time that the timestamps were collected by the time collector 124 (FIG. 1). In some aspects, the collection timestamp may be obtained from a timing device local to the time collector 124 (e.g., a slave timing device on the system upon which time collector 124 is executing). In some aspects, the collection timestamp may be obtained directly from the time service 102, or a specific timing device of time service 102 such as GPS time receiver 104. Each timestamp entry 210 includes a timing device ID 204, a timestamp 206, and an offset 208. Timing device ID 204 is a unique identifier associated with the timing device from which timestamp 206 was collected. Offset 208 is a value indicating an offset from a timing device used to synchronize the time on the timing device. In some aspects, the offset may be an offset from Coordinated Universal time (UTC). In some aspects, the offset may be an offset from the time according to a partner timing device that is used to synchronize time with the timing device associated with the timestamp entry. The partner device may be at a lower strata, and thus considered more accurate than the timing device associated with the timestamp entry.

A timestamp entry 210 may include other fields not shown in FIG. 2. For example, a timestamp entry 210 may include one or more of a customer ID that may be associated with an owner or operator of a time client 140, a service plan, a synchronization protocol used by the timing slave device 112, a host IP address, a subscription identifier, and/or a service usage indicator.

Figure 3:
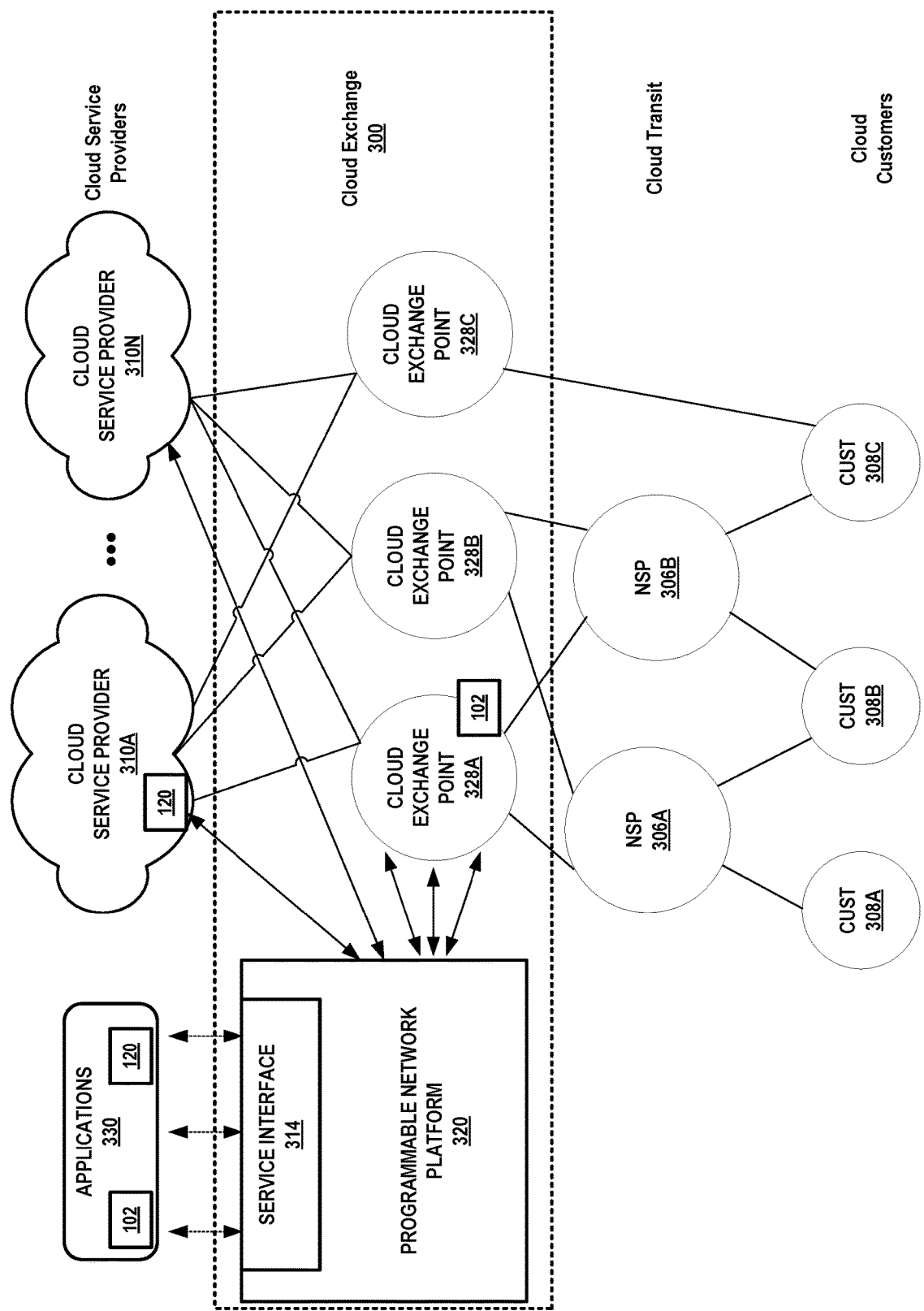
FIG. 3 illustrates a conceptual view of a network system having a metro-based cloud exchange that provides multiple cloud exchange points, a time service, and a timestamp tracing platform according to techniques described herein.

FIG. 3 illustrates a conceptual view of a network system having a metro-based cloud exchange that provides multiple cloud exchange points, a time service, and a timestamp tracing platform according to techniques described herein. The multiple cloud exchange points may be used to implement, at least in part, time service 102 and timestamp tracing platform 120. Each of cloud-based services exchange points 328A-328D (described hereinafter as "cloud exchange points" and collectively referred to as "cloud exchange points 328") of cloud-based services exchange 300 ("cloud exchange 300") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 300 may include more or fewer cloud exchange points 328. In some instances, a cloud exchange 300 includes just one cloud exchange point 328. As used herein, reference to a "cloud exchange" or "cloud-based services exchange" may refer to a cloud exchange point. A cloud exchange provider may deploy instances of cloud exchanges 300 in multiple different metropolitan areas, each instance of cloud exchange 300 having one or more cloud exchange points 328.

Each of cloud exchange points 328 includes network infrastructure and an operating environment by which cloud customers 308A-308D (collectively, "cloud customers 308") receive cloud services from multiple cloud service providers 310A-310N (collectively, "cloud service providers 310"). For example, a cloud exchange point 328 may include a time service 102. The cloud service providers 310 may host timestamp tracing platform 120. As noted above, the cloud service providers 310 may be public or private cloud service providers.

Cloud exchange 300 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer may connect to the one or more cloud services offered by the CSPs, respectively. Cloud exchange 300 allows private networks of any customer to be directly cross-connected to any other customer at a common point, thereby allowing direct exchange of network traffic between the networks of the customers.

Cloud customers 308 may receive cloud-based services directly via a layer 3 peering and physical connection to one of cloud exchange points 328 or indirectly via one of network service providers 306A-306B (collectively, "NSPs 306," or alternatively, "carriers 306"). Cloud customers 308 may include customers of time service 102 described above. NSPs 306 provide "cloud transit" by maintaining a physical presence within one or more of cloud exchange points 328 and aggregating layer 3 access from one or customers 308. NSPs 306 may peer, at layer 3, directly with one or more cloud exchange points 328 and in so doing offer indirect layer 3 connectivity and peering to one or more customers 308 by which customers 308 may obtain cloud services from the cloud exchange 300. Each of cloud exchange points 328, in the example of FIG. 3, is assigned a different autonomous system number (ASN). For example, cloud exchange point 328A is assigned ASN 1, cloud exchange point 328B is assigned ASN 2, and so forth. Each cloud exchange point 328 is thus a next hop in a path vector routing protocol (e.g., BGP) path from cloud service providers 310 to customers 308. As a result, each cloud exchange point 328 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 310 to customers. In other words, cloud exchange points 328 may internalize the eBGP peering relationships that cloud service providers 310 and customers 308 would maintain on a pair-wise basis. Instead, a customer 308 may configure a single eBGP peering relationship with a cloud exchange point 328 and receive, via the cloud exchange, multiple cloud services from one or more cloud service providers 310. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 308C is illustrated as having contracted with a cloud exchange provider for cloud exchange 300 to directly access layer 3 cloud services via cloud exchange points 328C. In this way, customer 308C receives redundant layer 3 connectivity to cloud service provider 310A, for instance. Customer 308C, in contrast, is illustrated as having contracted with the cloud exchange provider for cloud exchange 300 to directly access layer 3 cloud services via cloud exchange point 328C and also to have contracted with NSP 306B to access layer 3 cloud services via a transit network of the NSP 306B. Customer 308B is illustrated as having contracted with multiple NSPs 306A, 306B to have redundant cloud access to cloud exchange points 328A, 328B via respective transit networks of the NSPs 306A, 306B. The contracts described above are instantiated in network infrastructure of the cloud exchange points 328 by L3 peering configurations within switching devices of NSPs 306 and cloud exchange points 328 and L3 connections, e.g., layer 3 virtual circuits, established within cloud exchange points 328 to interconnect cloud service provider 310 networks to NSPs 306 networks and customer 308 networks, all having at least one port offering connectivity within one or more of the cloud exchange points 328.

In some examples, cloud exchange 300 allows a corresponding one of customers 308A, 308B of any network service providers (NSPs) or "carriers" 306A-306B (collectively, "carriers 306") or other cloud customers including customers 308C to be directly connected, via a virtual layer 2 (L2) or layer 3 (L3) connection to any other customer network and/or to any of CSPs 310, thereby allowing direct exchange of network traffic among the customer networks and CSPs 310. The virtual L2 or L3 connection may be referred to as a "virtual circuit."

Carriers 306 may each represent a network service provider that is associated with a transit network by which network subscribers of the carrier 306 may access cloud services offered by CSPs 310 via the cloud exchange 300. In general, customers of CSPs 310 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 310 via the cloud exchange 300.

In this way, cloud exchange 300 streamlines and simplifies the process of partnering CSPs 310 and customers (via carriers 306 or directly) in a transparent and neutral manner. One example application of cloud exchange 300 is a co-location and interconnection data center in which CSPs 310 and carriers 306 and/or customers 308 may already have network presence, such as by having one or more accessible ports available for interconnection within the data center, which may represent any of cloud exchange points 328. This allows the participating carriers, customers, and CSPs to have a wide range of interconnectivity options within the same facility. A carrier/customer may in this way have options to create many-to-many interconnections with only a one-time hook up to one or more cloud exchange points 328. In other words, instead of having to establish separate connections across transit networks to access different cloud service providers or different cloud services of one or more cloud service providers, cloud exchange 300 allows customers to interconnect to multiple CSPs and cloud services.

Cloud exchange 300 includes a programmable network platform 320 for dynamically programming cloud exchange 300 to responsively and assuredly fulfill service requests that encapsulate business requirements for services provided by cloud exchange 300 and/or cloud service providers 310 coupled to the cloud exchange 300. The programmable network platform 320 may, as a result, orchestrate a business-level service across heterogeneous cloud service providers 310 according to well-defined service policies, quality of service policies, service level agreements, and costs, and further according to a service topology for the business-level service. As an example, programmable network platform 320 may implement some or all of the functionality described herein provided by time service 102 or timestamp tracing platform 120.

The programmable network platform 320 enables the cloud service provider that administers the cloud exchange 300 to dynamically configure and manage the cloud exchange 300 to, for instance, facilitate virtual connections for cloud-based services delivery from multiple cloud service providers 310 to one or more cloud customers 308. The cloud exchange 300 may enable cloud customers 308 to bypass the public Internet to directly connect to cloud services providers 310 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 320 enables the cloud service provider to configure cloud exchange 300 with a L3 instance requested by a cloud customer 308, as described herein. A customer 308 may request an L3 instance to link multiple cloud service providers by the L3 instance, for example (e.g., for transferring the customer's data between two cloud service providers, or for obtaining a mesh of services from multiple cloud service providers).

Programmable network platform 320 may represent an application executing within one or more data centers of the cloud exchange 300 or alternatively, off-site at a back office or branch of the cloud provider (for instance). Programmable network platform 320 may be distributed in whole or in part among the data centers, each data center associated with a different cloud exchange point 328 to make up the cloud exchange 300. Although shown as administering a single cloud exchange 300, programmable network platform 320 may control service provisioning for multiple different cloud exchanges. Alternatively or additionally, multiple separate instances of the programmable network platform 320 may control service provisioning for respective multiple different cloud exchanges.

In the illustrated example, programmable network platform 320 includes a service interface (or "service API") 314 that defines the methods, fields, and/or other software primitives by which applications 330, such as a customer portal, may invoke the programmable network platform 320. The service interface 314 may allow carriers 306, customers 308, cloud service providers 310, and/or the cloud exchange provider programmable access to capabilities and assets of the cloud exchange 300 according to techniques described herein.

For example, the service interface 314 may facilitate machine-to-machine communication to enable dynamic provisioning of virtual circuits in the cloud exchange for interconnecting customer and/or cloud service provider networks. In this way, the programmable network platform 320 enables the automation of aspects of cloud services provisioning. For example, the service interface 314 may provide an automated and seamless way for customers to establish, de-install and manage interconnections among multiple, different cloud providers participating in the cloud exchange.

Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Figure 4:
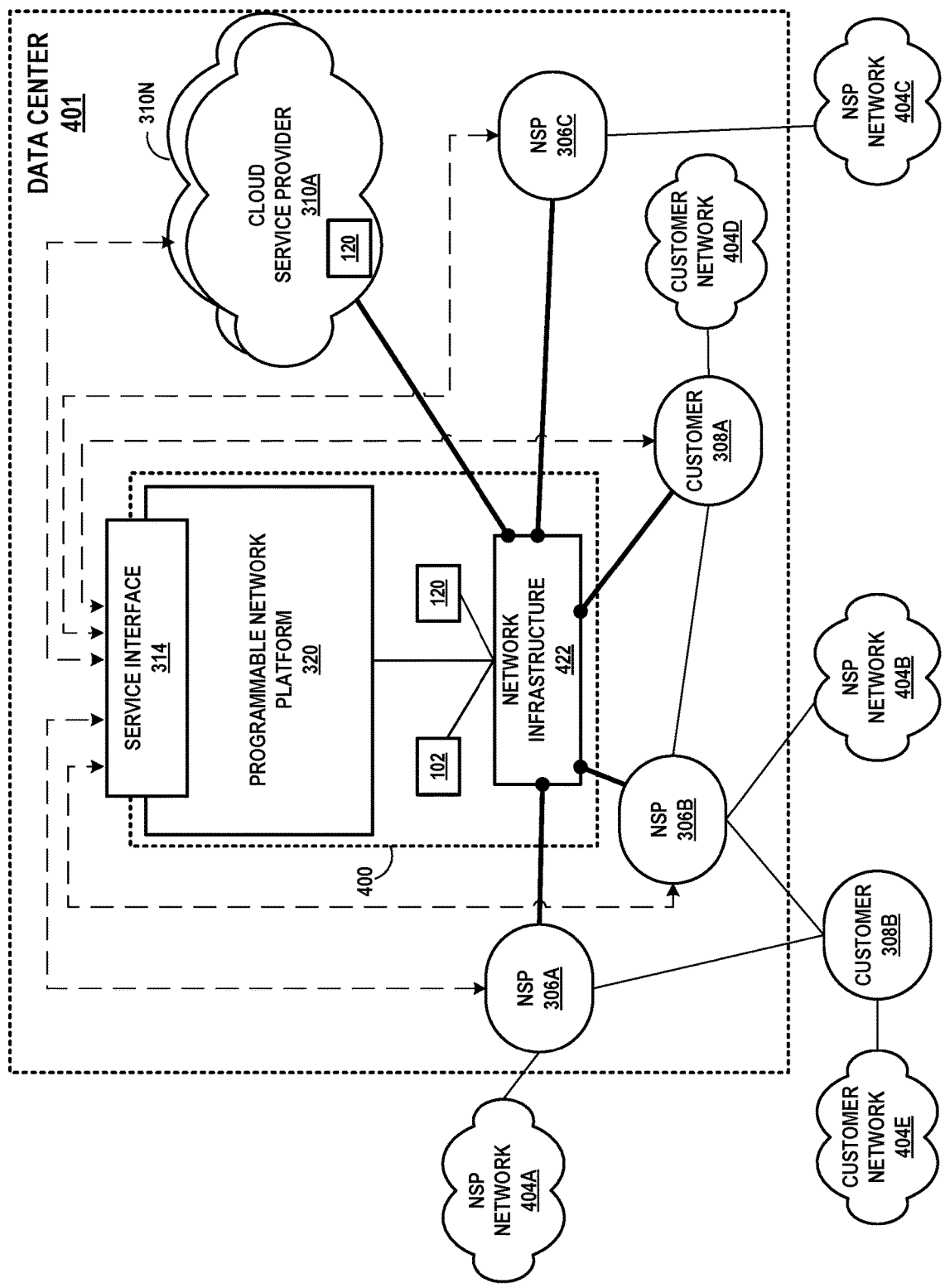
FIG. 4 is a block diagram illustrating an example of a data center-based cloud exchange point, according to techniques described herein.

FIG. 4 is a block diagram illustrating an example of a data center-based cloud exchange point, according to techniques described herein. Cloud-based services exchange 400 ("cloud exchange 400") allows a corresponding one of customer networks 404D, 404E and NSP networks 404A-404C (collectively, "'private' or 'carrier' networks 404") of any NSPs 306A-306C or other cloud customers including customers 308A, 308B to be directly connected, via a layer 3 (L3) or layer 2 (L2) connection to any other customer network and/or to any of cloud service providers 310A-310N, thereby allowing exchange of cloud service traffic among the customer networks and/or CSPs 310. Data center 401 may be entirely located within a centralized area, such as a warehouse or localized data center complex, and provide power, cabling, security, and other services to NSPs, customers, and cloud service providers that locate their respective networks within the data center 401 (e.g., for co-location) and/or connect to the data center 401 by one or more external links.

Network service providers 306 may each represent a network service provider that is associated with a transit network by which network subscribers of the NSP 306 may access cloud services offered by CSPs 310 via the cloud exchange 400. In general, customers of CSPs 310 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 310 via the cloud exchange 400.

In this way, cloud exchange 400 streamlines and simplifies the process of partnering CSPs 310 and customers 308 (indirectly via NSPs 306 or directly) in a transparent and neutral manner. One example application of cloud exchange 400 is a co-location and interconnection data center in which CSPs 310, NSPs 306 and/or customers 308 may already have network presence, such as by having one or more accessible ports available for interconnection within the data center. This allows the participating carriers, customers, and CSPs to have a wide range of interconnectivity options in the same facility.

Cloud exchange 400 of data center 401 includes network infrastructure 422 that provides a L2/L3 switching fabric by which CSPs 310 and customers/NSPs interconnect. This enables an NSP/customer to have options to create many-to-many interconnections with only a one-time hook up to the switching network and underlying network infrastructure 422 that presents an interconnection platform for cloud exchange 400. In other words, instead of having to establish separate connections across transit networks to access different cloud service providers or different cloud services of one or more cloud service providers, cloud exchange 400 allows customers to interconnect to multiple CSPs and cloud services using network infrastructure 422 within data center 401, which may represent any of the edge networks described in this disclosure, at least in part. A time service 102 or timestamp tracing platform 120 may be coupled to network infrastructure 422.

By using cloud exchange 400, customers can purchase services and reach out to many end users in many different geographical areas without incurring the same expenses typically associated with installing and maintaining multiple virtual connections with multiple CSPs 310. For example, NSP 306A may expand its services using network 404B of NSP 306B. By connecting to cloud exchange 400, an NSP 306 may be able to generate additional revenue by offering to sell its network services to the other carriers. For example, NSP 306C may offer the opportunity to use NSP network 404C to the other NSPs.

Cloud exchange 400 includes a programmable network platform 320 that exposes at least one service interface, which may include in some examples and are alternatively referred to herein as application programming interfaces (APIs) in that the APIs define the methods, fields, and/or other software primitives by which applications may invoke the programmable network platform 320. As an example, the functionality provided by timestamp tracing platform 120 may be implemented on programmable network platform 320. The software interfaces allow NSPs 306 and customers 308 programmatic access to capabilities and assets of the cloud exchange 400. The programmable network platform 320 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 400 (e.g., customers 308 and NSPs 306) to create software applications that allow and leverage access to the programmable network platform 320 by which the applications may request that the cloud exchange 400 establish connectivity between the customer and cloud services offered by any of the CSPs 310. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to or between cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider seller side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

Service interface 314 facilitates machine-to-machine communication to enable dynamic service provisioning and service delivery assurance. In this way, the programmable network platform 320 enables the automation of aspects of cloud services provisioning. For example, the software interfaces may provide an automated and seamless way for customers to establish, de-install and manage interconnection with or between multiple, different cloud providers participating in the cloud exchange. The programmable network platform 320 may in various examples execute on one or virtual machines and/or real servers of data center 401, or off-site.

In the example of FIG. 4, network infrastructure 422 represents the cloud exchange switching fabric and includes multiple ports that may be dynamically interconnected with virtual circuits by, e.g., invoking service interface 314 of the programmable network platform 320. Each of the ports is associated with one of carriers 306, customers 308, and CSPs 310.

In some examples, a cloud exchange seller (e.g., an enterprise or a CSP nested in a CSP) may request and obtain an L3 instance, and may then create a seller profile associated with the L3 instance, and subsequently operate as a seller on the cloud exchange. The techniques of this disclosure enable multiple CSPs to participate in an Enterprise's L3 instance (e.g., an L3 "routed instance" or L2 "bridged instance") without each CSP flow being anchored with an enterprise device.

In some aspects, the programmable network platform may provision a cloud exchange to deliver services made up of multiple constituent services provided by multiple different cloud service providers, where this is provided via the L3 instance as a service described herein. Each of these constituent services is referred to herein as a "micro-service" in that it is part of an overall service applied to service traffic.

That is, a plurality of micro-services may be applied to service traffic in a particular "arrangement," "ordering," or "topology," in order to make up an overall service for the service traffic. The micro-services themselves may be applied or offered by the cloud service providers 310.

Figure 5:
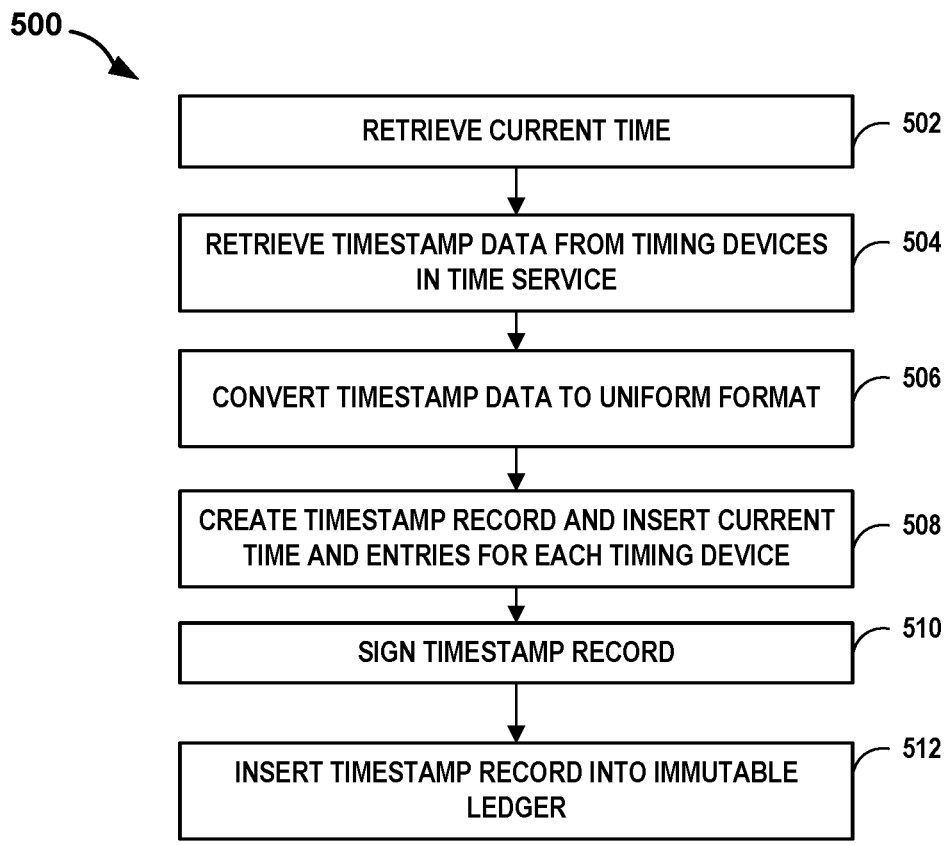
FIG. 5 is a flowchart illustrating operations for an example method for tracing timestamps in accordance with the current disclosure.

FIG. 5 is a flowchart 500 illustrating operations for an example method for tracing timestamps in accordance with the current disclosure. The operations may begin when a time collector is triggered by an event or an expiration of a timer. The time collector may obtain the current time for use as a collection timestamp (502). In some aspects, the time collector may collect timestamps from timing devices, for example, the timing devices of a time service (504). The time collector may collect offsets from the timing devices instead of, or in addition to, the timestamps. In some aspects, the timing devices may use different formats to represent a timestamp. The time collector may convert the timestamps received from the timing devices into a single, uniform format (506).

A timestamp record can be created with a timestamp entry for each timing device providing a timestamp (and/or offset) (508). The collection timestamp for the timestamp record can be set to the timestamp obtained when the time collector was triggered. The timestamps and offsets for each timing device may be set for the timestamp entry corresponding to the timing device. In some aspects, a customer ID associated with the timing device may be stored in the timestamp entry associated with the timing device.

In some aspects, the timestamp record may be signed, e.g., cryptographically (510). The timestamp record may be signed with a DID associated with the timestamp tracing platform to aid in authenticating the timestamp record. In some aspects, the timestamp record may be signed using the DID of the customer (e.g., tenant) associated with a slave timing device in the timestamp record. The signed timestamp record may then be inserted into the time ledger 134.

Figure 6:
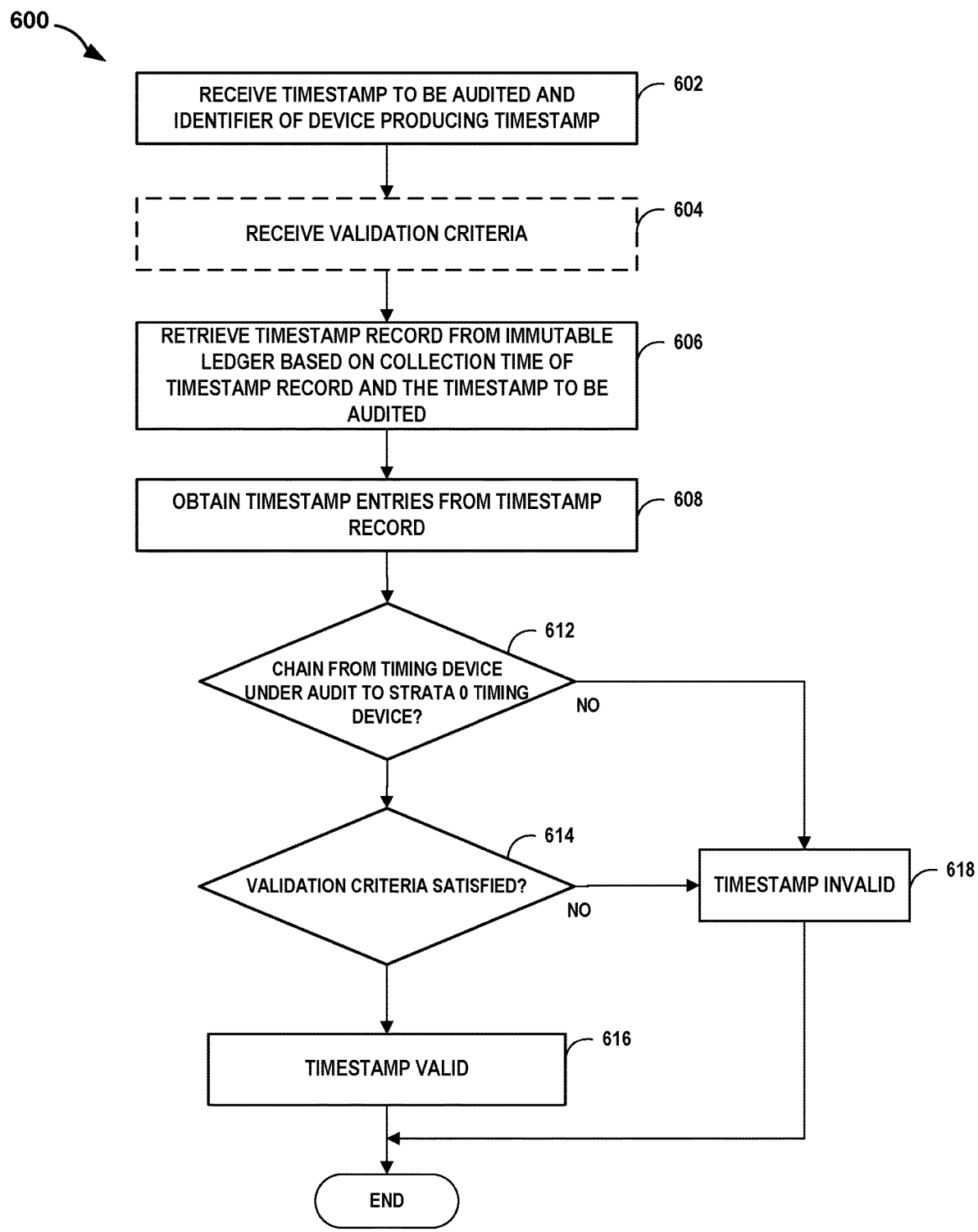
FIG. 6 is a flowchart illustrating operations for an example method for auditing timestamps in accordance with the current disclosure.

FIG. 6 is a flowchart 600 illustrating operations for an example method for auditing timestamps in accordance with the current disclosure. As an example, the operations of flowchart 600 may be performed by an auditor 150 (FIG. 1). The operations may be performed in response to a request to audit a timestamp, for example, a timestamp stored as part of a transaction. The auditor 150 may receive, as part of the request, a timestamp to be audited and a timing device identifier of the timing device that produced the timestamp (602). In some aspects, the request may include validation criteria that are be used in determining whether the timestamp is valid (604). As an example, the validation criteria may require that the offset associated with the timing device that produced the timestamp to be audited be<=30 microseconds from UTC. The request may also include a customer identifier associated with the timestamp to be audited.

The auditor retrieves a timestamp record from the time ledger 134 (606). In some aspects, the auditor is restricted to searching those timestamp records that are associated with the customer ID associated with the timestamp to be audited. As an example, the customer may give permission to an auditor to audit a timestamp produced by a timing slave device 112 of a time client 140 associated with the customer. The auditor's credentials may be granted access to the customers timestamp records. The auditor may select the timestamp record having a collection time that is closest (in time) to the timestamp to be audited.

The auditor can obtain the timestamp entries in the timestamp record (608). In some aspects, the auditor can determine if the timing devices associated with the timestamp entries in the timestamp record form an unbroken chain of timing devices that ends at a strata zero timing device such as GPS time receiver 104 (612). If the timing device producing the timestamp to be audited cannot be traced back to a strata zero timing device ("NO" branch of 612), the timestamp may be considered invalid (618). Otherwise, if the timing device producing the timestamp to be audited can be traced back to a strata zero timing device ("YES" branch of 612), the auditor can the check if the validation criteria are satisfied (614). For example, the auditor may correlate timestamps entries for the timing devices using the collection timestamp. In other words, the timestamp values and offsets of the timing devices that were sampled by the time collector 124 at the time indicated by the collection timestamp are selected. The auditor can then use the individual timing device's offsets from their respective master devices to determine, from the chain of timing devices an aggregate offset that will comprise an offset from UTC of the master device that synchronizes with the timing device that produced the timestamp to be audited. The auditor may check to determine if this offset is less than a predetermined or configurable threshold of UTC. If the validation criteria are not satisfied ("NO" branch of 614), the timestamp to be audited may be considered invalid (618). If the validation criteria are satisfied, the timestamp to be audited may be considered valid (616).

Figure 7:
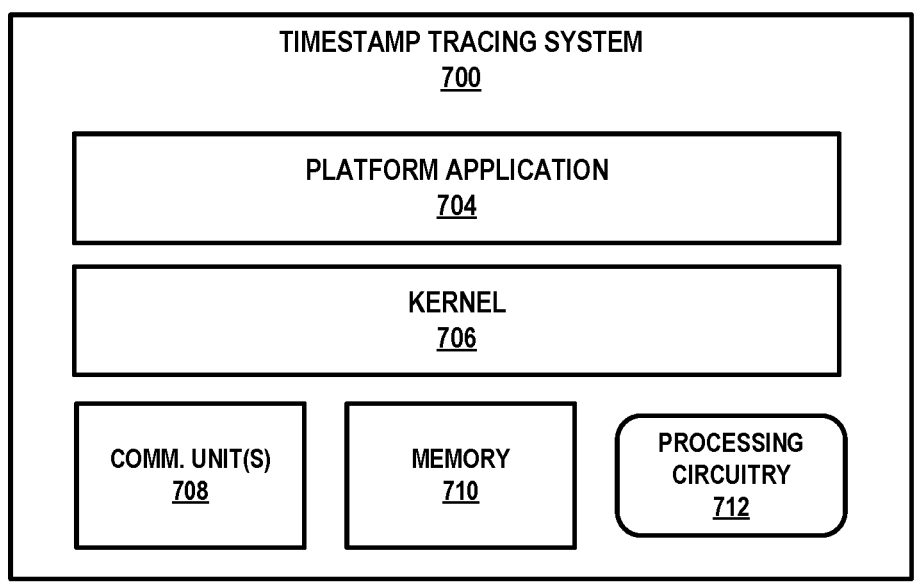
FIG. 7 is a block diagram illustrating an example timestamp tracing system in accordance with techniques described in this disclosure.

FIG. 7 is a block diagram illustrating an example timestamp tracing system 700 in accordance with techniques described in this disclosure. Timestamp tracing system 700 may implement a timestamp tracing platform 120 (FIG. 1). Timestamp tracing system 700 may represent one or more real and/or virtual server devices or other computing devices. Timestamp tracing system 700 includes a software stack including kernel 706 and platform application 704. Platform application 704 may be any of time collector 124, aggregator 128, timestamp record generator 130, signer 132, or authenticator 122. Kernel 706 may represent a Linux or other operating system kernel.

Memory 710 may store information for processing during operation of the stack. In some examples, memory 710 may include temporary memories, meaning that a primary purpose of the one or more storage devices is not long-term storage. Memory 710 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 710, in some examples, also include one or more computer-readable storage media. Memory 710 may be configured to store larger amounts of information than volatile memory. Memory 710 may further be configured for long-term storage of information as non-volatile memory space and retain information after activate/ off cycles. Examples of non-volatile memories include magnetic hard disks, optical discs, floppy disks, Flash memories, or forms of electrically programmable memories (EPROM) or electrically erasable and programmable (EEPROM) memories. Memory 710 may store program instructions and/or data associated with one or more of the modules described in accordance with one or more aspects of this disclosure.

Processing circuitry 712 and memory 710 may provide an operating environment or platform for kernel 706 and platform application 704, which may be implemented as software, but may in some examples include any combination of hardware, firmware, and software. Processing circuitry 712 may execute instructions and memory 710 may store instructions and/or data of one or more modules. The combination of processing circuitry 712 and memory 710 may retrieve, store, and/or execute the instructions and/or data of one or more applications, modules, or software. Processing circuitry 712 and memory 710 may also be operably coupled to one or more other software and/or hardware components, including, but not limited to, one or more of the components illustrated in FIG. 7.

One or more communication units 708 of timestamp tracing system 700 may communicate with devices external to timestamp tracing system 700 by transmitting and/or receiving data, and may operate, in some respects, as both an input device and an output device. In some examples, communication units 708 may communicate with other devices over a network. In other examples, communication units 708 may send and/or receive radio signals on a radio network such as a cellular radio network. Examples of communication units 708 include a network interface card (e.g., an Ethernet card), an optical transceiver, a radio frequency transceiver, a GPS receiver, or any other type of device that can send and/or receive information. Other examples of communication units 708 may include Bluetooth®, GPS, 3G, 4G, and Wi-Fi® radios found in mobile devices as well as Universal Serial Bus (USB) controllers and the like.

A platform application 704 may include one or more hardware and/or software processes for performing operations attributed to a timestamp tracing platform 120 as described herein.

Figure 8:
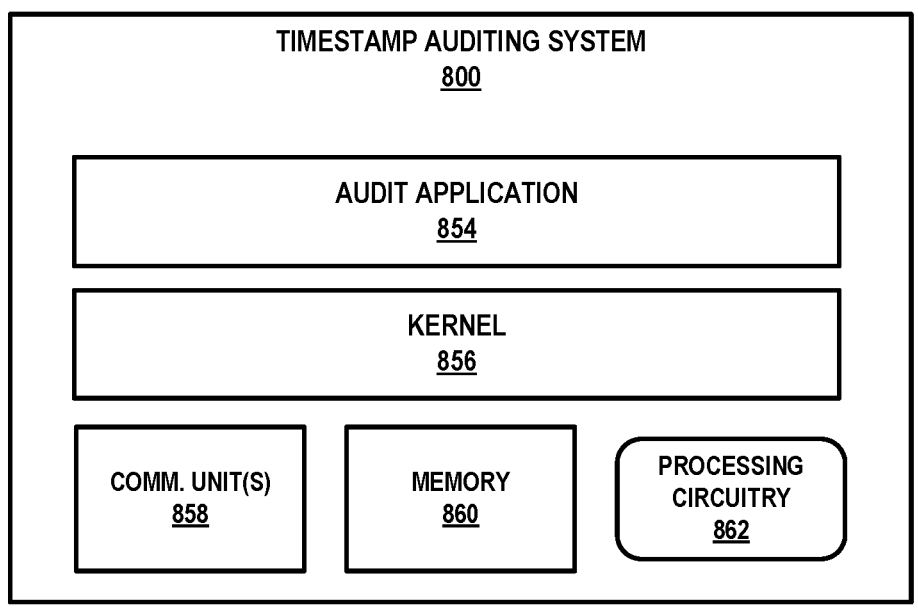
FIG. 8 is a block diagram illustrating an example timestamp auditing system in accordance with techniques described in this disclosure.

FIG. 8 is a block diagram illustrating an example timestamp auditing system 800 in accordance with techniques described in this disclosure. Timestamp auditing system 800 may implement auditor 150 (FIG. 1). Timestamp auditing system 800 may represent one or more real and/or virtual server devices or other computing devices. Timestamp auditing system 800 includes a software stack including kernel 856 and auditing application 854. Kernel 856 may represent a Linux or other operating system kernel.

Memory 860 may store information for processing during operation of the stack. In some examples, memory 860 may include temporary memories, meaning that a primary purpose of the one or more storage devices is not long-term storage. Memory 860 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 860, in some examples, also include one or more computer-readable storage media. Memory 860 may be configured to store larger amounts of information than volatile memory. Memory 860 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 860 may store program instructions and/or data associated with one or more of the modules described in accordance with one or more aspects of this disclosure.

Processing circuitry 862 and memory 860 may provide an operating environment or platform for kernel 856 and auditing application 854, which may be implemented as software, but may in some examples include any combination of hardware, firmware, and software. Processing circuitry 862 may execute instructions and memory 860 may store instructions and/or data of one or more modules. The combination of processing circuitry 862 and memory 860 may retrieve, store, and/or execute the instructions and/or data of one or more applications, modules, or software. Processing circuitry 862 and memory 860 may also be operably coupled to one or more other software and/or hardware components, including, but not limited to, one or more of the components illustrated in FIG. 8.

One or more communication units 858 of Timestamp auditing system 800 may communicate with devices external to Timestamp auditing system 800 by transmitting and/or receiving data, and may operate, in some respects, as both an input device and an output device. In some examples, communication units 858 may communicate with other devices over a network. In other examples, communication units 858 may send and/or receive radio signals on a radio network such as a cellular radio network. Examples of communication units 858 include a network interface card (e.g., an Ethernet card), an optical transceiver, a radio frequency transceiver, a GPS receiver, or any other type of device that can send and/or receive information. Other examples of communication units 858 may include Bluetooth®, GPS, 3G, 4G, and Wi-Fi® radios found in mobile devices as well as Universal Serial Bus (USB) controllers and the like.

Auditing application 854 may include one or more hardware and/or software processes for performing operations attributed to auditor 150 as described herein.

Depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), graphics processing units (GPUs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:
   receiving, at a collection time by a time collector executable by processing circuitry, a timestamp from each of a plurality of timing devices;
   aggregating, by an aggregator comprising processing circuitry, the timestamp of each of the plurality of timing devices into a timestamp record, the timestamp record including a collection timestamp indicating the collection time and a timestamp entry for each of the plurality of timing devices, wherein the timestamp entry for each timing device includes a timing device identifier and the timestamp corresponding to the timing device providing the timestamp, wherein each timestamp entry is for a different timing device of the plurality of timing devices; and
   inserting the timestamp record into an immutable time ledger to enable retrieval of the timestamp record based on the collection time.

2. The method of claim 1, further comprising signing the timestamp record by a tenant of a data center including at least one of the plurality of timing devices.

3. The method of claim 1, further comprising converting the timestamp into a uniform format prior to creating the timestamp entry for the timing device.

4. The method of claim 1, wherein the plurality of timing devices comprises a hierarchy of timing devices with different time precisions.

5. The method of claim 1, further comprising:
   determining an offset value comprising a difference between a timestamp from a first timing device of the plurality of timing devices and a timestamp from a second timing device of the plurality of timing devices, the second timing device having a different accuracy than the first timing device; and
   storing the offset value in the timestamp entry for the first timing device.

6. The method of claim 5, wherein the second timing device comprises a Global Positioning System (GPS) time receiver.

7. The method of claim 1, wherein inserting the timestamp record into the immutable ledger comprises inserting the timestamp record into a blockchain ledger.

8. The method of claim 1, wherein the receiving the timestamp from each of the plurality of timing devices comprises one of:
   receiving the timestamps at periodic intervals; and
   receiving the timestamps in response to a trigger event.

9. A method comprising:
   receiving, by an auditor executed by processing circuitry from a requesting computing device, a request to audit a timestamp, the request including a timestamp to be audited and an identifier of a timing device producing the timestamp to be audited;
   retrieving, by the auditor from an immutable ledger stored on a computer-readable medium, the immutable ledger storing a plurality of timestamp records collected over time, a timestamp record of the plurality of timestamp records based on a collection timestamp indicating a collection time of the timestamp record that is closest to the timestamp to be audited, the plurality of timestamp records including at least one timestamp entry for a second timing device having a greater accuracy than the timing device producing the timestamp to be audited;
   validating, by the auditor, the timestamp to be audited based on timestamp entries of the retrieved timestamp record; and
   outputting an indication whether the timestamp to be audited is valid or invalid based on the validating.

10. The method of claim 9, further comprising:
    receiving, by the auditor, a validation criteria;
    wherein validating the timestamp to be audited comprises:
       obtaining, from the timestamp record, timestamp entries of respective timing devices; and
       determining that the timestamp to be audited is valid in response to determining that the timestamp entries indicate that a chain of timing devices from the timing device producing the timestamp to be audited to a strata zero timing device exists and that the timestamp to be audited satisfies the validation criteria.

11. The method of claim 10, wherein determining that the timestamp to be audited satisfies the validation criteria comprises:
    correlating the timestamp entries of the timestamp record in accordance with the collection timestamp obtained when a time collector collected the timestamp entries in the timestamp record;
    determining, based on an offset of each correlated timestamp entry, an offset from Coordinated Universal time (UTC) of a timing master device that synchronizes with the timing device providing the timestamp to be audited; and determining whether the offset from UTC is less than a threshold specified by the validation criteria.

12. The method of claim 10, wherein the timing devices comprise a hierarchy of timing devices, the hierarchy based on an accuracy of the one or more timing devices.

13. The method of claim 10, wherein the strata zero timing device comprises a Global Positioning System (GPS) time receiver.

14. The method of claim 9, further comprising converting the timestamp to be audited into a uniform format prior to validating the timestamp to be audited.

15. The method of claim 9, wherein the immutable ledger comprises a blockchain ledger.

16. A system comprising:
a plurality of timing devices;
a time collector comprising processing circuitry configured to obtain, from each timing device of the plurality of timing devices a timestamp and a timing device ID; and
an aggregator comprising processing circuitry configured to:
generate a timestamp record, the timestamp record including a collection timestamp indicating a collection time at which the time collector obtained the timestamps from the plurality of timing devices, and a timestamp entry for each of the plurality of timing devices, each timestamp entry including the timing device ID and the timestamp of the corresponding timing device of the plurality of timing devices, wherein each timestamp entry is for a different timing device of the plurality of timing devices, and insert the timestamp record into an immutable ledger to enable retrieval of the timestamp record based on the collection time.

17. The system of claim 16, further comprising:
a tenant device, the tenant device including a timing slave device, the timing slave device comprising one of the plurality of timing devices; and
an auditor comprising processing circuitry configured to determine that a timestamp produced by the timing slave device satisfies a validation criteria.

18. The system of claim 17, wherein to determine that the timestamp produced by the timing slave device satisfies the validation criteria comprises to:
correlate the timestamp entries of the timestamp record in accordance with a collection timestamp obtained when the time collector collected the timestamp entries in the timestamp record;
determine, based on an offset of each correlated timestamp entry, an offset from Coordinated Universal time (UTC) of a timing master device that synchronizes with the timing slave device; and
determine whether the offset from UTC is less than a threshold specified by the validation criteria.

19. The system of claim 16, further comprising an authenticator comprising processing circuitry and configured to authenticate the plurality of timing devices and the time collector.

\* \* \* \* \*